Feb. 17, 1942.   W. MAXSON ET AL   2,273,652
MATHEMATICAL APPARATUS
Filed Dec. 1, 1936   12 Sheets-Sheet 1

INVENTORS
William L. Maxson and
Peter J. McLaren.
BY
ATTORNEYS

Feb. 17, 1942.  W. MAXSON ET AL  2,273,652
MATHEMATICAL APPARATUS
Filed Dec. 1, 1936   12 Sheets-Sheet 2

INVENTORS
William L. Maxson and
Peter J. McLaren
BY Moses & Nolte
ATTORNEYS

INVENTORS
William L. Maxson and
Peter J. McLaren
BY *Moses & Nolte*
ATTORNEYS

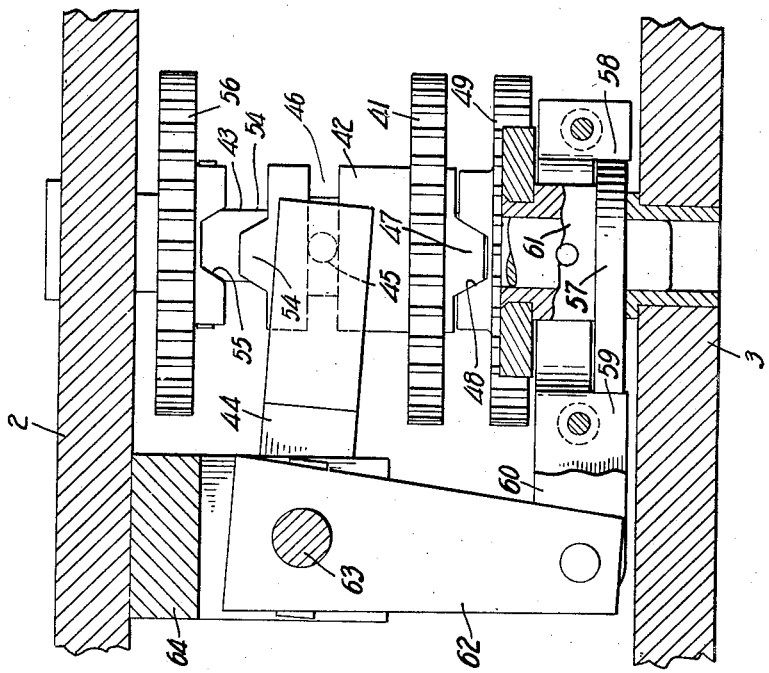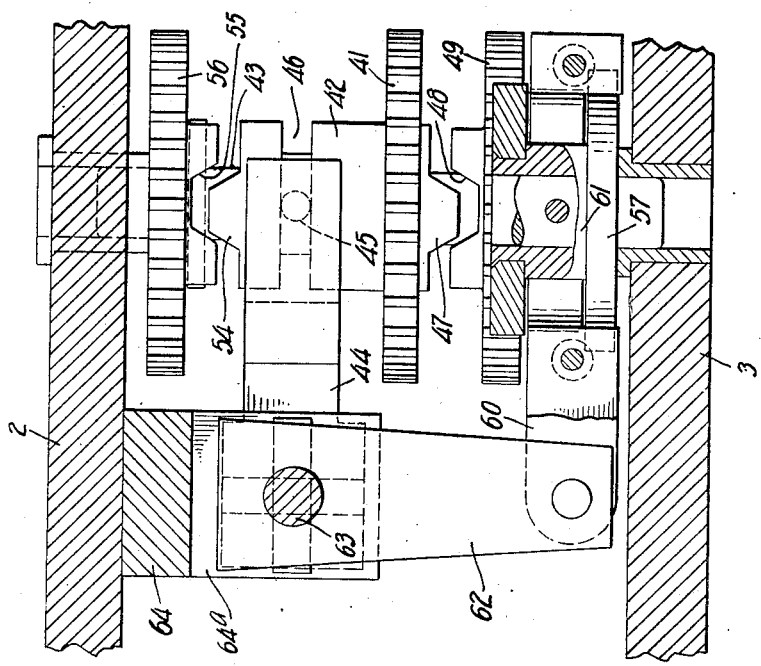

Feb. 17, 1942.  W. MAXSON ET AL  2,273,652
MATHEMATICAL APPARATUS
Filed Dec. 1, 1936   12 Sheets-Sheet 8
Fig. 13.
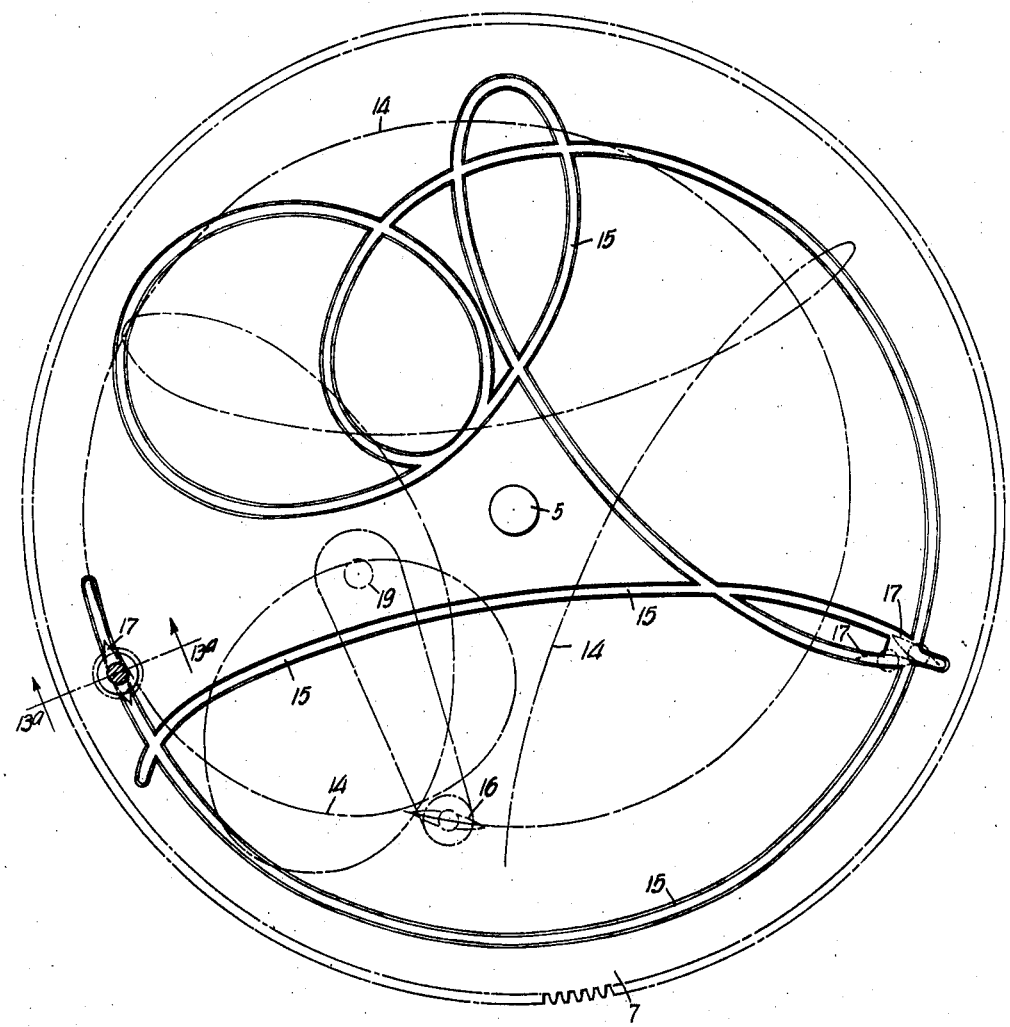
Fig. 13ª
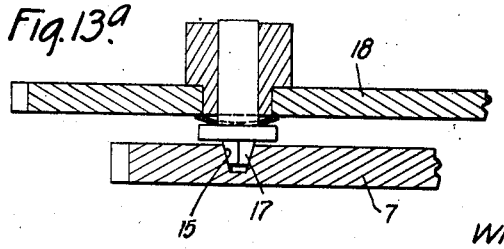
INVENTOR.
William L. Maxson and
Peter J. McLaren.
BY Moses & Nolte
ATTORNEYS Feb. 17, 1942.　　　W. MAXSON ET AL　　　2,273,652
MATHEMATICAL APPARATUS
Filed Dec. 1, 1936　　　12 Sheets-Sheet 10

INVENTORS
William L. Maxson and
Peter J. McLaren.
BY Moses + Nolte
ATTORNEYS

Feb. 17, 1942.   W. MAXSON ET AL   2,273,652
MATHEMATICAL APPARATUS
Filed Dec. 1, 1936   12 Sheets-Sheet 12

INVENTOR.
William L. Maxson and
Peter J. McLaren.
BY
ATTORNEY.

Patented Feb. 17, 1942

2,273,652

UNITED STATES PATENT OFFICE 2,273,652

MATHEMATICAL APPARATUS

William Maxson, South Orange, N. J., and Peter J. McLaren, New York, N. Y., assignors, by mesne assignments, to Reconstruction Finance Corporation, New York, N. Y., a corporation of the United States Application December 1, 1936, Serial No. 113,572

8 Claims. (Cl. 235—61)

This invention relates to scientific apparatus for mechanically generating or indicating the value of a non-linear function of a basic variable. While certain features of the invention are of broader applicability, the invention will be illustratively described in that application in which the basic variable is an angle and the non-linear function is the cosine of the angle.

The object of the disclosed apparatus with reference to this specific illustrative use is to provide an input or primary operating member which may be operated in proportion to any angle, and to cause the output always to stand away from zero by an amount, and in the direction, corresponding to the cosine of the angle. Since the output must start from 1 the extent of departure of the output mechanism from the starting position must be at all times proportional to the versedsine of the indicated angle. Such an apparatus may be used in various ways for performing complex mathematical computations such as are required in navigation, but for the purpose of this application the problem involved and the utility of the device will be sufficiently indicated by assuming that it is desired to show on one indicator the values of the angle, and simultaneously and dependently to show on another indicator the corresponding values of the cosine of the angle.

Broadly the mechanism may include cam and gear mechanism capable of continuously indicating the value of the cosine as the angle increases from zero to 90°. The second quadrant has the same law of variation in absolute values as it would have if the prime mover were operated from the 90° point back to zero. Provision is accordingly made of an input reverser for reversing the drive between the prime mover and the cam mechanism at 90°. This reverser alone, however, would cause the counter to indicate the cosine as increasing from zero to 1 which would not be correct for the second quadrant, since the cosine diminishes from zero to minus 1. Provision is accordingly made of an output reverser between the cam and the cosine indicating counter so that the value of the indicated cosine will continue to diminish through the second quadrant.

At 180° the driving connection between the prime mover and the cam is again reversed so as to cause the absolute values of the cosine passed through in the second quadrant to be retraced. Since the cosine increases in value from 180° to 270° and the operation of the input reverser alone accomplishes this, the output reverser is not operated at the 180° point. At 270° the input reverser is again operated to cause the absolute values passed through in the third quadrant to be retraced in the fourth quadrant, but since the cosine increases in value in both the third and fourth quadrants no reversal of the output is desired. Hence the output reverser is operated at 270° to counteract the effect on the cosine indicating counter of the operation of the input reverser.

Other features of the invention have to do with the cam mechanism and associated parts irrespective of the reversing mechanism referred to in the preceding paragraph. It is a feature of the invention that the cosine generating mechanism is designed to operate through a plurality of revolutions in order to produce the cosine values for a single quadrant. By this means, the instrument may be made very sensitive an accurate so that the amount of error is held within narrow limits.

Other objects and advantages will hereinafter appear.

In the drawings forming part of this specification

Fig. 11 is a fragmentary, detail sectional view taken on line 11—11 of Fig. 4, and showing one of the reversing clutches in an intermediate position;

Fig. 12 is a view similar to Fig. 11 showing the same reversing clutch in a fully engaged position;

Fig. 13 is a plan view partly diagrammatic of the lower control cams showing the relation of its cam track with respect to the cam track of the upper cam, the cams and followers being shown in position corresponding to 0° of the degree register;

Fig. 13a is a fragmentary sectional view, taken on line 13a—13a of Fig. 13, and showing details of a cam follower;

Figure 3:
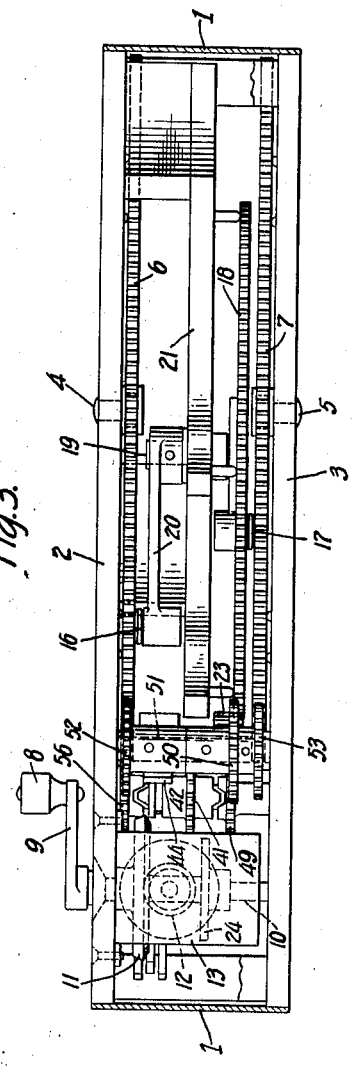
Fig. 3 is a vertical sectional view taken on the line 3—3 of Fig. 1 looking in the direction of the arrows.

The illustrative apparatus desirably comprises a housing 1 which includes top and bottom frame members 2 and 3. The frame members 2 and 3 support shafts 4 and 5, respectively, (Figs. 1 and 3) which are co-axially disposed. A large horizontal gear 6 is rotatably supported upon the shaft 4, and a horizontal gear 7 of the same size as the gear 6 is rotatably supported upon the shaft 5. These gears are connected to operate in unison at all times, and are at times referred to herein as a primary member.

For the present the reversing mechanism will be ignored. The reversing mechanism will be described later after the means governing the relation of output to input has been described, and after it has been made clear how the output will correspond to the law of variation of the versed-sine through the first quadrant.

The prime operating member may consist of a handle 8 carried by a crank 9, the crank being fast upon a shaft 10. The shaft 10 is connected through bevel gears 11 and 12 with a degree counter 13 and through alternative trains, to be described later, with the gears 6 and 7. When a quadrant is referred to, a rotation sufficient to cause the counter to count up to 90° is meant and not the degree of rotation of any gear or gears present in the illustrative apparatus. Operating the counter through the first quadrant results in rotation of the gears 6 and 7 through a little more than four complete revolutions, or to be exact through $4^1/_{24}$ revolutions, always in the same direction and at a rate bearing a uniform relation to the rate of rotation to the shaft 10. The fact that $4^1/_{24}$ revolutions has been mentioned is not to be taken as limiting the present invention in any sense, but merely as descriptive as what is actually shown for illustrative purposes. So far as known, the design admits of wide variation, but the apparatus designed as illustrated is found to be well calculated to carry out the purposes of the invention.

Figure 14:
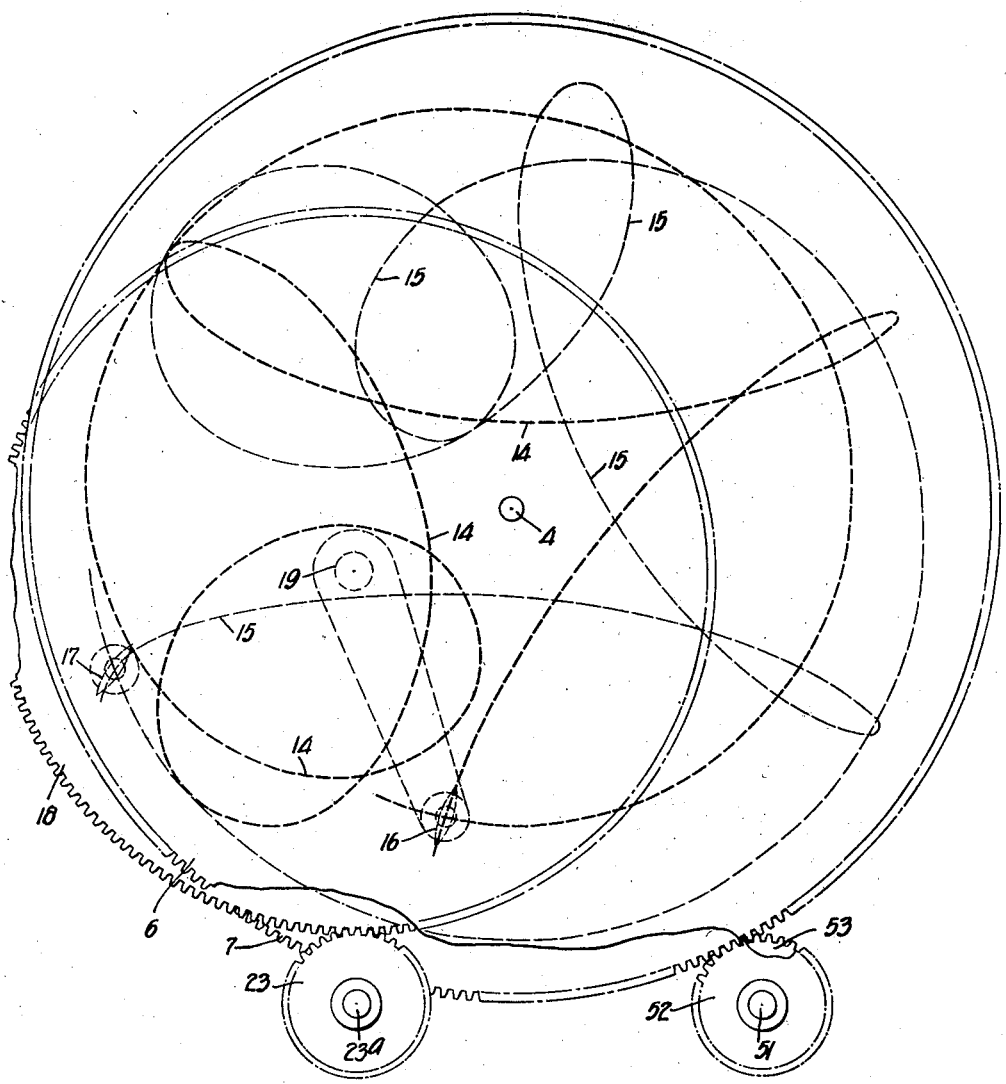
Fig. 14 is a plan view partly diagrammatic showing the relation of the two cams to one another and to the follower or output gear, the parts being shown in the same position as Fig. 1.

The gears 6 and 7 are also cams, and each bears upon its surface facing toward the other a cam track, as best shown in Figs. 13, 13a and 14. The cam track on gear 6 is designated 14 and the cam track on gear 7 is designated 15. These tracks act, respectively, upon followers 16 and 17 which are elongated and wedge shaped. The followers as will now be pointed out, serve to drive a gear 18 (hereinafter referred to as a secondary member) which is mounted eccentrically of gears 6 and 7 upon a vertical shaft 19, and disposed between the gears 6 and 7. The cam follower 17 is journalled directly in the body of the gear 18 in the outer marginal portion thereof, and the follower 16 is journalled upon the outer end of a crank 20 at the same distance from the axis of shaft 19 as the follower 17. The shaft 19 is supported and journalled in a frame web 21, which extends between the gears 6 and 7 and the crank 20 and the gear 18 are fast on the shaft 19 at opposite sides of the web 21, the crank being disposed above the web and the gear below the web. The followers 16 and 17 are disposed upon angularly related radii, and are desirably disposed as illustrated, at 90° to one another. The cam tracks are so related that the drive effected by the tracks 14 and 15 is never inharmonious, but since each drive does at times pass through dead center positions, the provision of plural, angularly related drives is necessary.

It would scarcely be useful to attempt to describe the cam tracks in detail. It may be remarked, however, that each of the cam tracks comprises a plurality of convolutions or loops and is laid out consistently with causing the output gear 18 to turn through four complete revolutions during the operation of the counter 13 from zero to 90°. The total amount of rotation is such that the gear 18 may, through direct and constant gearing, operate a counter 22 (Figs. 1 and 2) to indicate at all times the value of the cosine corresponding to the value of the angle indicated by the counter 13. The arrangement as shown avoids the necessity of using planetary or bodily moveable gears, and provides long cam tracks which may be made to yield satisfactorily accurate results for practical purposes.

The gear 18 operates a gear 23 secured to a shaft 23a, which gear, in turn, through suitable gearing to be described, operates the cosine indicating counter 22.

Since it is desired to follow in the second quadrant the exact reverse of absolute values of the first quadrant, and since this can very definitely be done by reversing the direction of the rotation of the gears 6 and 7, provision is made of an input reverser for reversing the direction of the gears 6 and 7 at the instant when the counter 13 reaches a reading of 90°. This results in a reversal of the rotations of the gears 18 and 23, which would cause the absolute values of the cosine in the second quadrant to be correctly indicated by the counter 22, but would not take into account the fact that the cosine values are negative in the second quadrant. In other words, the cosine should diminish in the second quadrant from zero to minus 1. In order to produce this kind of effect upon the counter 22, provision is made of a second or output reverser after the gear 23. This reverser is caused to operate upon the counter 13 indicating 90°. When the counter 22 goes to the negative side of zero, 9 shows in the wheel of highest denomination, which is the units wheel, and indicates that the complement of the correct cosine value is shown on the decimal number wheels. In other words, to secure the correct cosine value in numbers, the indicated amount would have to be subtracted from ten. The fact that the cosine value is negative and that the subtraction referred to would have to be performed is indicated by the fact that the number 9 shows on the units wheel. It will be observed that the versedsine increases in the second quadrant from 1 to 2, and hence that the total operation of the counter 22 from the starting point continues to be proportional to the versedsine.

Figure 1:
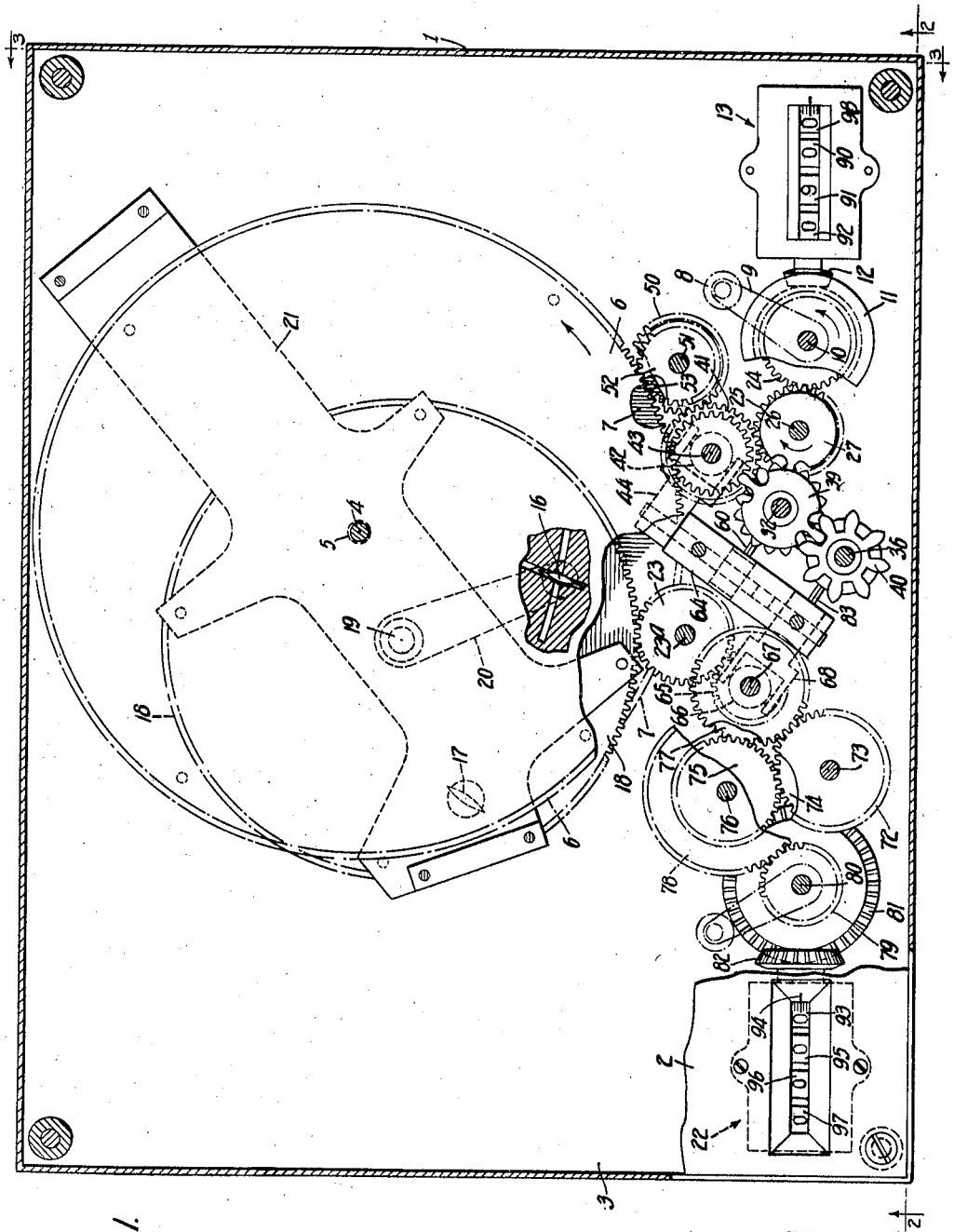
Fig. 1 is a plan view, partly in section on line 1—1 of Fig. 2, of a device embodying features of the invention, the parts being shown in the position they occupy when the degree register is set at 90°.
Figure 2:
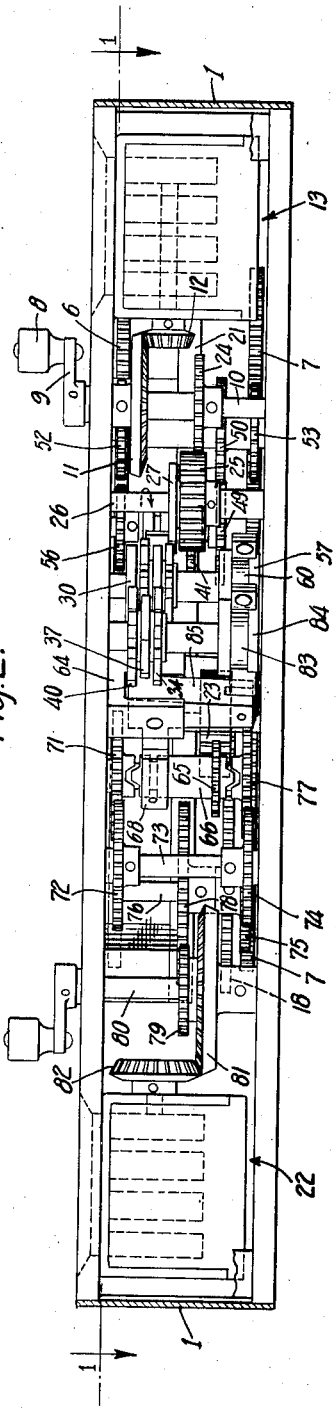
Fig. 2 is a vertical sectional view taken on the line 2—2 of Fig. 1 looking in the direction of the arrows.
Figure 5:
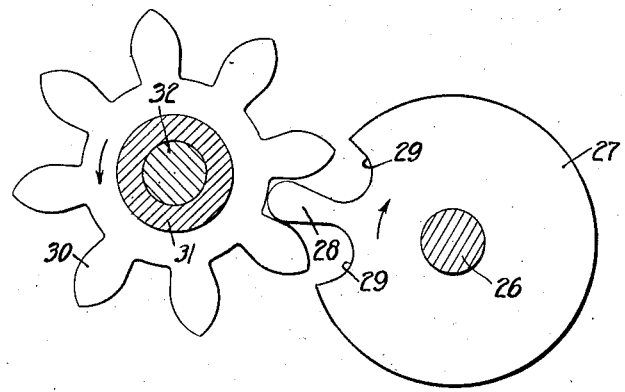
Fig. 5 is a detail view showing the drive from the input shaft to the first Geneva gear.
Figure 6:
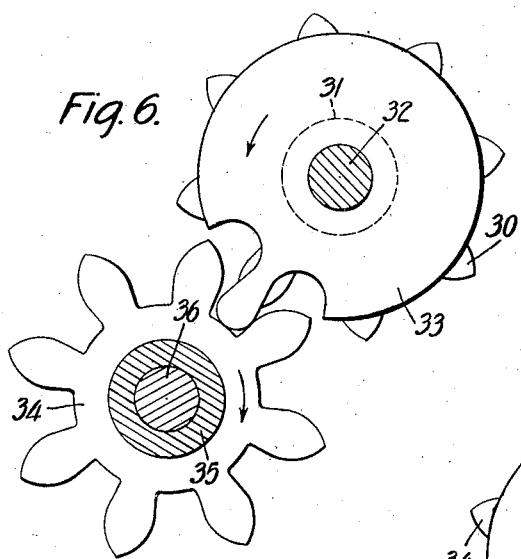
Fig. 6 is a view similar to Fig. 5 showing the drive from the first Geneva gear to the second Geneva gear.
Figure 7:
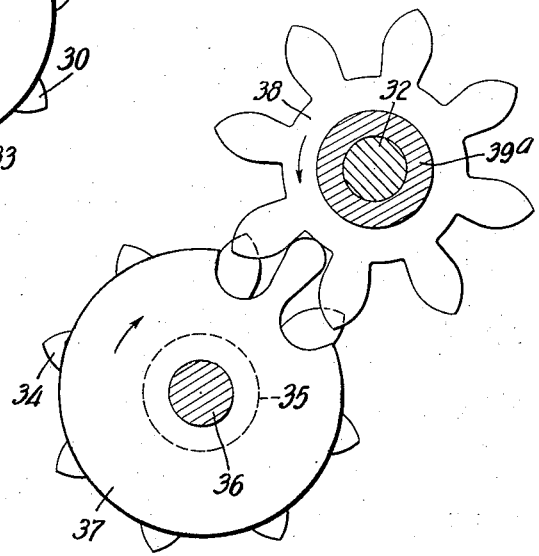
Fig. 7 is a sectional detailed view showing the drive from the second Geneva gear to a third Geneva gear, the third Geneva gear being mounted upon the same shaft as the first Geneva gear.
Figure 9:
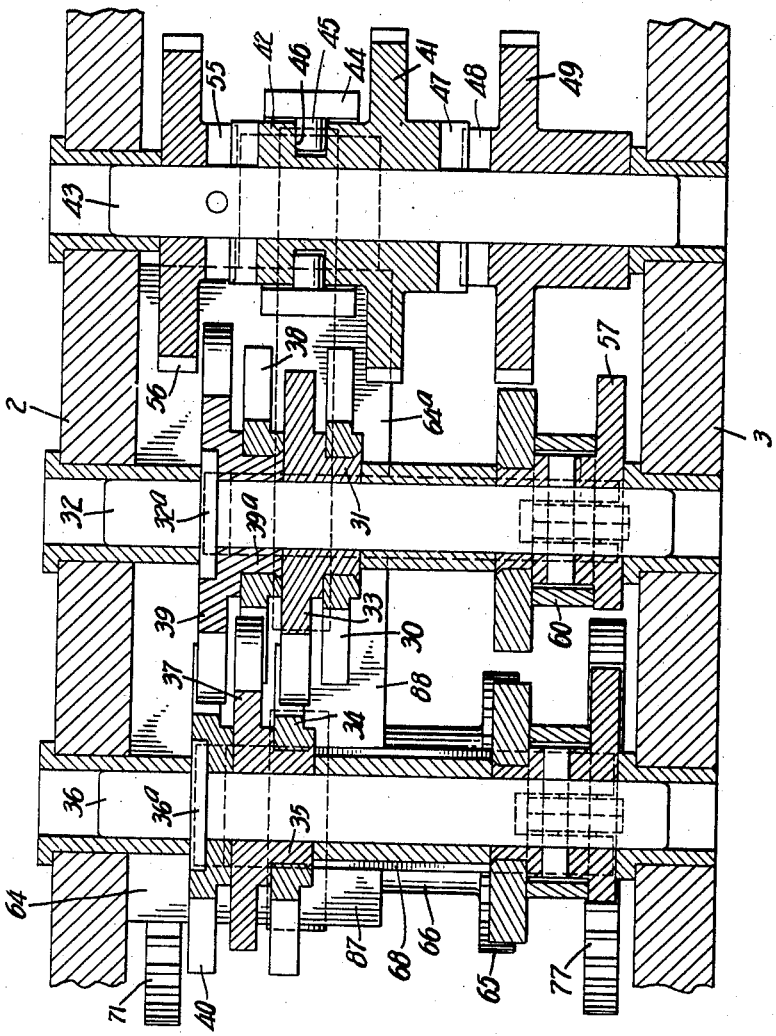
Fig. 9 is a fragmentary sectional view taken upon the line 9—9 of Fig. 4.
Figure 10:
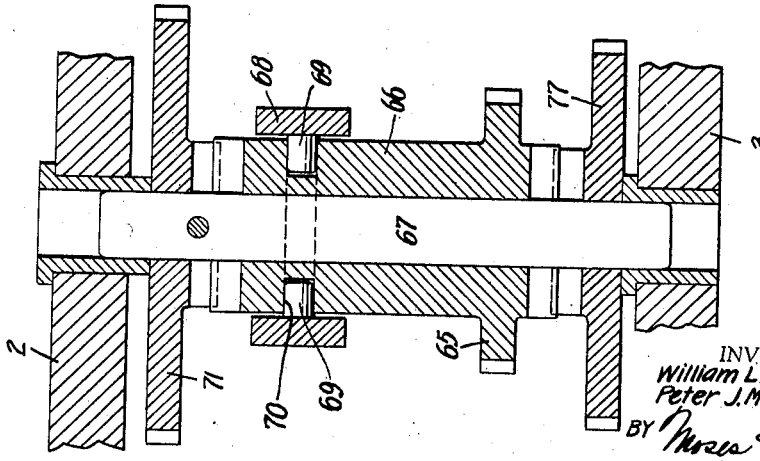
Fig. 10 is a fragmentary sectional view taken upon the line 10—10 of Fig. 4.

The shaft 10 has a gear 24 mounted upon it which drives a gear 25 fast on an input shaft 26 (Figs. 1 and 2). The ratio of gears 24 and 25 is such that the gear 25 is turned through exactly thirty-two complete revolutions during the turning of the counter 13 from zero to 90°. The shaft 26 has fast upon it a single toothed gear 27 which forms one element of a Geneva train. The gear 27 is circular throughout its periphery except for the tooth 28 and notches 29 (Figs. 4 and 5) formed at the opposite sides of the tooth 28. The circular portion of the gear 27 normally stands tangent to two teeth of a gear 30 journalled upon a shaft 32. The gear 27, therefore, holds the gear 30 normally against rotation, but when the tooth 28 comes into position to engage between teeth of the gear 30, the gear 30 is free to be turned and is driven through a quarter of a revolution, and is then again locked against rotation by the gear 27. The gear 30 is secured to a hub 31 of (Figs. 5, 6, and 9) a Geneva driving gear 33 similar to the gear 27 and this in turn alternately locks and drives a gear 34 journalled upon a shaft 36. Once in each revolution the gear 33 drives the gear 34 through a quarter of a revolution. Similarly, the gear 34 is secured to a hub 35 of a Geneva driving gear 37 which alternately drives, and locks against rotation, a gear 38 (see Fig. 7 also) which is fast upon a hub 39a of a two toothed Geneva driving gear 39.

The Geneva driving gear 39 is secured to the shaft 32 by a member 32a thereof and alternately locks and drives a gear 40 secured to the shaft 36 by a member 36a.

Rotation of the shaft 32 controls the input reversing mechanism which is interposed between the input gear 25 on the shaft 26 and the cam gears 6 and 7. Rotation of the shaft 36 controls the operation of an output reversing mechanism which is interposed between the gear 23 and the counter 22. From the description of the Geneva gearing which has been given, it will be apparent that the shaft 32 is turned through a quarter of a revolution after each sixteen revolutions of the shaft 26, and that the shaft 36 is turned through a quarter of a revolution after each thirty-two revolutions of the shaft 26. As will be apparent, however, when the clutch shifting devices of the reversing mechanism are described, the reversing mechanisms are not operated each time that their control shafts are turned a quarter turn, but only after every second quarter turn operation of their control shafts. The result is that the input reverser is operated after exactly 32 revolutions of the shaft 26 and the output reverser is operated after exactly sixty-four revolutions of the shaft 26. By so selecting the gearing to the shaft 26 and to the counter 13 as to cause thirty-two complete revolutions of the shaft 26 to correspond exactly with the running of 90° into the counter, the input reverser will be caused to operate after every 90° of the counter, while the output reverser will be caused to operate after every 180° of the counter. The output reverser is initially so arranged, however, that its first operation will occur at 90° and its subsequent operations will occur thereafter at 180° intervals. The Geneva mechanism for operating the clutches acts as counting means for counting the input revolutions.

The connections from the gear 25 to the gears 6 and 7 are so arranged that in one position of the input reverser there is, in effect, but one gear interposed between the gear 25 and the gears 6 and 7, but in the other position of the input reverser there is, in effect, a train of two gears interposed. Obviously the shifting of the reverser from one of its positions to the other will reverse the direction of the rotation of the gears 6 and 7 with relation to the rotation of the gear 25.

Figure 8:
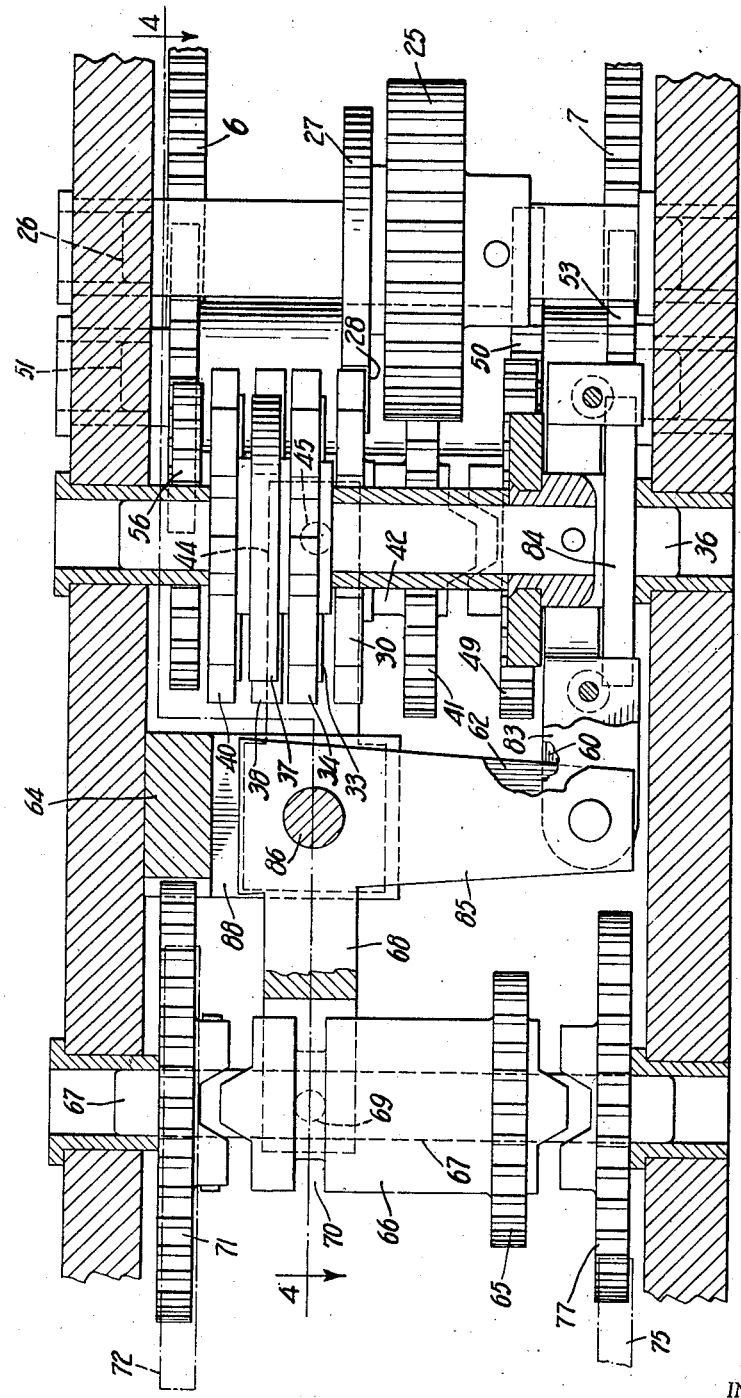
Fig. 8 is a fragmentary sectional view taken upon the line 8—8 of Fig. 4.

The gear 25 is broad toothed gear (Figs. 2 and 8) capable of maintaining continuous driving engagement with a shiftable gear 41 which is fast upon a shiftable clutch sleeve 42. The clutch sleeve 42 is slidable upon a shaft 43, and is embraced by a clutch shifting fork 44. The fork 44 has fingers 45 (Figs. 4 and 9) which ride in a circumferential groove 46 of the sleeve 42. The gear 41 is constantly driven in the same direction by the gear 25, and constantly drives the clutch sleeve 42.

When the clutch sleeve 42 is in its lower position (Fig. 12) a rib 47 of the sleeve engages in a diametrical groove 48, formed in the hub of a gear 49 which is journalled upon the shaft 43. The gear 49 (see Fig. 3) drives a gear 50 which is fast upon a shaft 51. The shaft 51 also has fast upon it upper and lower gears 52 and 53 which engage and drive gears 6 and 7, respectively. When this driving train is established the rotation of the gears 6 and 7 will be in the opposite direction from rotation of the gear 25 or, in other words, will be counter-clockwise when the gear 25 is rotated clockwise.

When the clutch sleeve 42 is in its upper position, however, the rib 47 and the gear 48 are disengaged, and a rib 54 in the upper end of the sleeve 42 (Fig. 12) enters a diametrical groove 55 in the lower face of the hub of a gear 56 secured to shaft 43. The gear 56 is then driven in unison with the gear 41. The gear 56 meshes directly with the gear 6 to drive it, and the gear 7 is rotated in unison with the gear 6 by virtue of the fact that the gears 6 and 7 are in mesh, respectively, with the gears 52 and 53, the latter gear being both fast on the shaft 51. When this driving train is established the gears 6 and 7 rotate in the same direction as the gear 25.

The operation of the clutch shifting fork 44 to effect this reversal is controlled, as has been stated, from the shaft 32. It will be remembered that the shaft 32 is given a quarter turn for each sixteen revolutions of the shaft 26. The shaft 32 has fast upon it a cam 57 (see Figs. 4 and 12) which turns between abutments 58 and 59 carried by a collar or yoke 60. The collar 60 extends around the shaft 32 and is guided by a hub 61 of the shaft. The cam has a high side and a low side, the high side being arranged to extend through substantially more than 90°. The quarter turn of the cam which acts to carry the high side under one of the abutments 58, 59 terminates with the cam in a position such that the high side still has more than 90° of travel in engagement with such abutment. The next quarter turn of the cam is, therefore, ineffective, but the second following quarter turn causes the cam to come to rest 180° away from the first position of rest and, therefore, with the opposite abutment in engagement with the beginning of the high side. Thus, alternate quarter turns of the cam (which is fast on the shaft 32) effect reversals.

Figure 4:
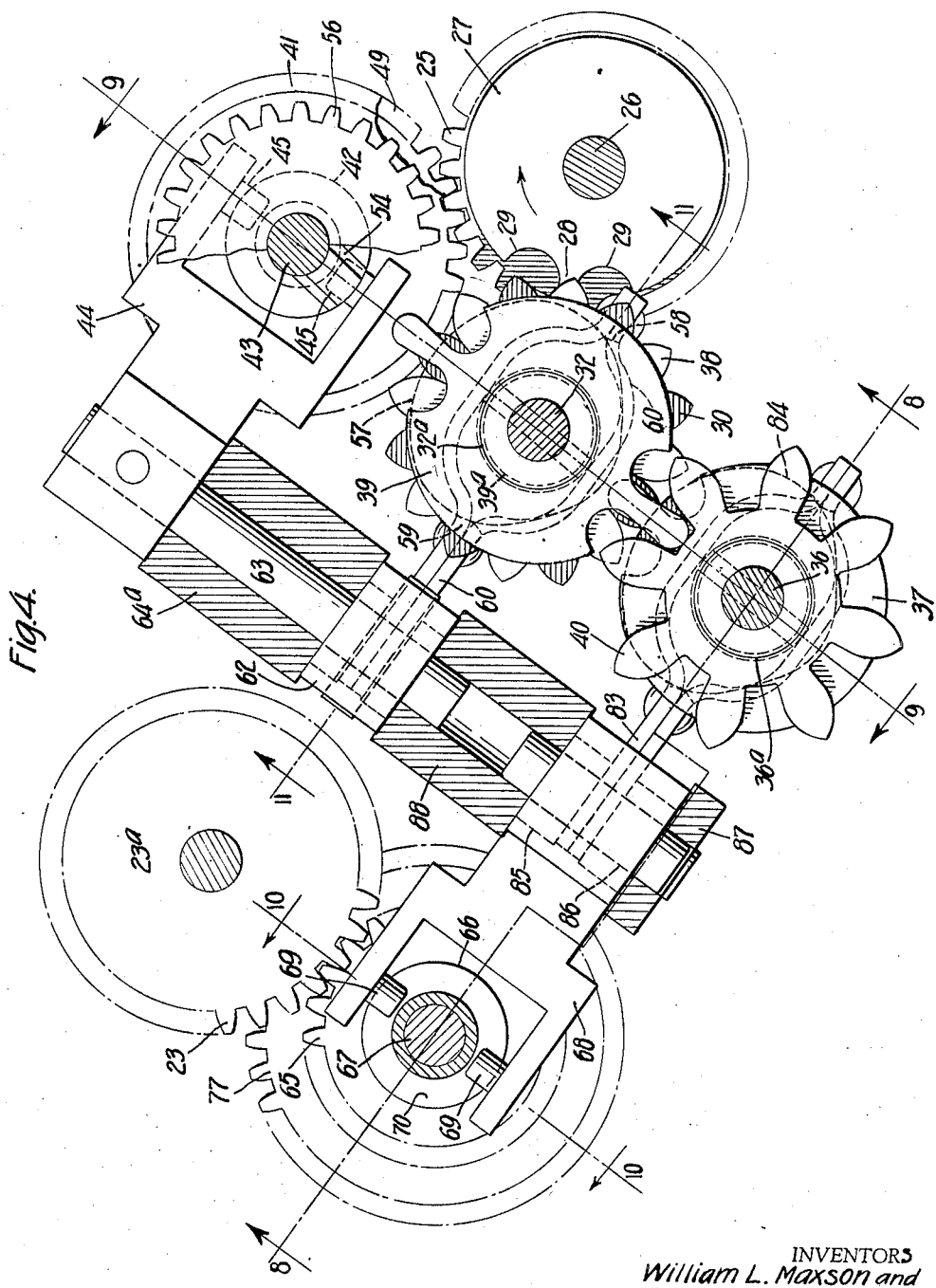
Fig. 4 is a detail horizontal sectional view showing positions of the reversing mechanisms and Geneva gearing for controlling the reversing mechanisms.

The collar or yoke 60 is pivotally connected to the crank 62 fast upon a shaft 63 (Figs. 4 and 11). The shaft 63 is journalled in a lug 64a of bearing bracket 64 carried by the frame. The shaft 63 also has fast upon it the clutch shifting fork 44. Thus, each time that the yoke 60 is thrust to the left as viewed in Fig. 12 the clutch sleeve 42 is connected to drive the gear 49, and each time that the yoke 60 is shifted to the right the clutch sleeve is connected to drive the gear 56.

The operation of the output reversing mechanism is similar to that of the input reversing mechanism. The gear 23 (Figs. 1 and 2) is a broad toothed gear which constantly drives a gear 65 fast on a clutch sleeve 66 (see Figs. 4 and 8 also). The clutch sleeve 66 is slidably and rotatably mounted upon a shaft 67. A clutch shifting yoke 68 extends around the sleeve 66 and includes fingers 69 which engage in a circumferential groove 70 of the sleeve 66. The sleeve 66 is similar in construction and principles of operation with the clutch sleeve 42 (Fig. 9) which has already been described. When the sleeve 66 is up it drives a gear 71 secured to the shaft 67 (Fig. 8) and which meshes with a gear 72 fast on a shaft 73, (Figs. 1 and 2). The shaft 73 also has fast upon it a gear 74 which drives a gear 75 fast on a shaft 76, the rotation of the gear 75 being in the same direction as the rotation of the gear 65.

When the sleeve 66 is down, however, it drives a gear 77 which rotates freely on the shaft 67 and which meshes directly with the gear 75 and hence serves to drive the shaft 76 in the opposite direction to that in which the gear 65 turns. The shaft 76 has fast upon it a gear 78 which drives a gear 79 fast on a shaft 80. The shaft 80 through bevel gears 81 and 82 drives the counter 22.

The shifting of the sleeve 66 is effected in the same manner as the shifting of the sleeve 42 and by similar mechanism. A yoke 83 (Figs. 1, 2, 4 and 8) is controlled by a cam 84 fast on the shaft 36. In this instance, however, the yoke 83 is connected to an arm 85 which is unitary with the clutch shifting yoke 68 and which forms with the clutch shifting yoke a bell crank. The bell crank 68—85 is journalled upon a shaft 86 which is mounted on lugs 87 and 88 of bracket 64. The proper interrelation of the two reversing devices depends upon the relative angular positions in which the cams 57 and 85 are fixed upon their respective shafts.

Figure 18:
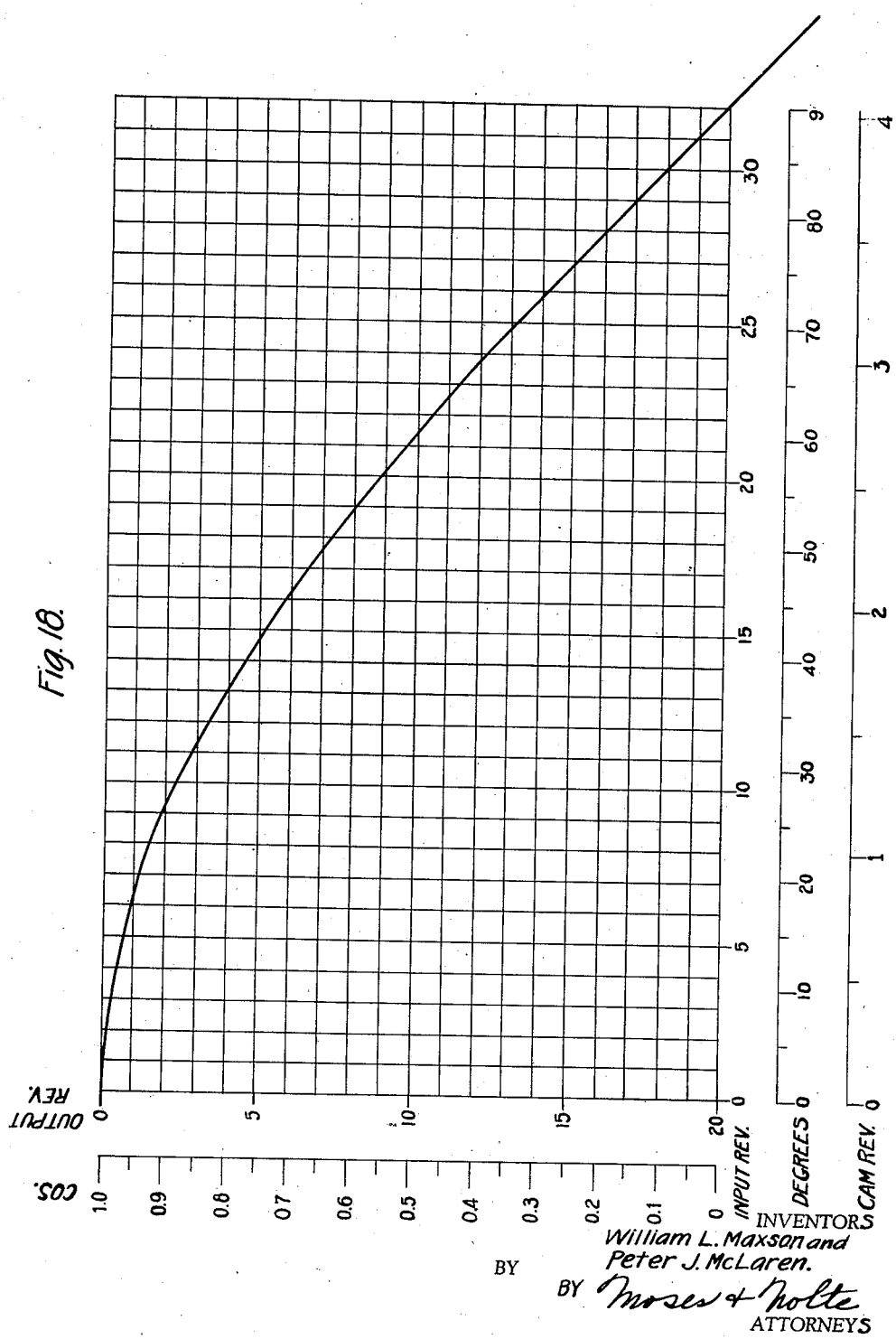
Fig. 18 is a diagram showing the relationship of input and output revolutions to cam revolutions and to the magnitude of the angle whose function is to be indicated.

It has been made clear that the gear relations and the features of design of the illustrative mechanism are susceptible of substantial variation. The relationship of the various parts of the illustrative apparatus are diagrammatically indicated, however, in Fig. 18 for the purpose of making the description of the illustrative apparatus clear and complete. The graph shows a cosine curve for the first quadrant in which the abscissa scale marked "input revolutions," refers to revolutions of the input shaft 26, and the ordinate scale marked "output revolutions" refers to revolutions of the gear 23. The input revolutions are proportional to the degrees indicated on the counter 13 so that the abscissa values might equally well be represented by the degree scale just below the chart which reads from zero to 90°. The output revolutions are proportional to the versedsine; that is (1—cosine). The cosine scale corresponding to the output revolutions can accordingly be computed from the chart, and the appropriate values of the cosine are indicated in the column to the left of the output revolution scale.

The scale at the bottom of the sheet marked cam revolutions refers to the revolutions of the gears 6 and 7 which are, of course, proportional to the revolutions of the shaft 26 in any quadrant counted by the counter.

Figure 17:
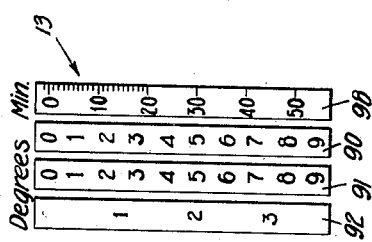
Fig. 17 is a developed view showing the number wheels of an angle indicating counter.
Figure 16:
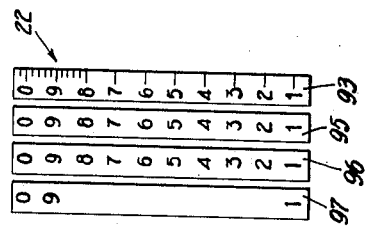
Fig. 16 is a developed view showing the arrangement of the number wheels of a cosine indicating counter.

Counters of the kind employed in the illustrative apparatus are well-known. The counters will not, therefore, be described in detail. On the degree counter, the number wheels are arranged as shown in Figure 17. The wheel 98 of lowest denomination is the minute wheel and has its periphery divided into 60 equal divisions representing minutes. One revolution of this wheel causes a carry-over to the next wheel 90, which is the degree wheel of lowest denomination. This wheel is moved step by step by the carry-over from the minutes wheel through ten equal steps and in turn carries over to the ten's wheel 91 which is similarly constructed and operated. The ten's wheel carries over to the hundreds wheel 92 which has its periphery divided into four equal divisions and bears the digits 1, 2, 3 and blank. The counter is desirably so arranged that it cannot count beyond 360°, but so that it can, if desired, be set to zero from that point without disturbing the normal operating train. This may be accomplished, for example, by making provision of a clutch between the shaft 10 and the gear 24 which can be disengaged when it is desired to reset the counter 13 to zero without operating the other parts.

The counter 22 for indicating the values of the cosines is an ordinary decimal counter. The thousandths wheel 93 is the wheel of lowest denomination and bears the digits from zero to nine to indicate thousandths. The spaces between the digits, however, are subdivided by uniform scale marks so that the cosine value can be read to ten-thousandths by reference to an index mark 94 (Fig. 1) on the counter frame. The wheel 93 is driven smoothly, but the hundredths wheel 95, the tenths wheel 96, and the units wheel 97, are each driven step by step by carry-over from the wheel of next lower denomination. The digits from two to eight may be omitted or not, as desired, on the units wheel 97, since they would never be operated to a visible position.

Both the counters 13 and 22 are capable of operation in either a forward or a backward direction.

Figure 15:
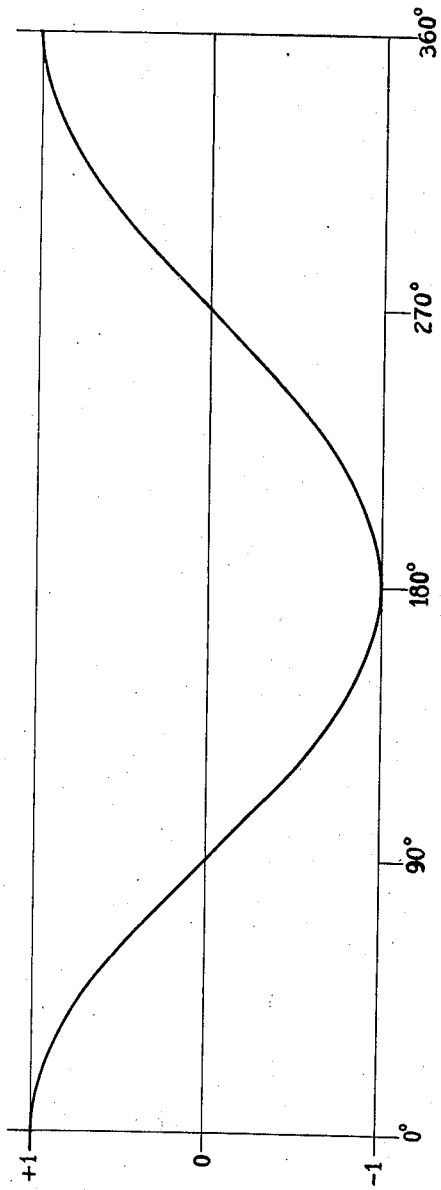
Fig. 15 is a diagram of a cosine curve which will be referred to in explaining the principle of the invention.

It will be noted that while the apparatus has been described as for the purpose of indicating the cosine, the cosine curve representing the fourth quadrant in Fig. 15 is the same from 270° to 360° as the sine curve would be from zero to 90°, and similarly that the first quadrant of the cosine curve corresponds to the second quadrant of the sine curve, the second quadrant of the cosine curve corresponds to the third quadrant of the sine curve and the third quadrant of the cosine curve corresponds to the fourth quadrant of the sine curve. The apparatus as illustrated might, therefore, very readily be converted into a sine indicating apparatus by the simple expedient of operating it backward 90° from zero and then setting the degree counter to zero without disturbing the other parts. Ensuing operation of the apparatus would cause the counter 22 to correctly indicate the sines of the angles indicated by the counter 13.

Taking as a reference position the position in which the counter 22 reads 0, the amount of departure of the output mechanism from the 0 reference position is always proportional to a function of the indicated angle which varies between +1 and −1; i. e., the since or the cosine of the angle indicated by the counter 13, depending upon the initial relative setting of the counter 13 and the remainder of the apparatus.

The graph of Figure 15 shows that the curve in each quadrant is either a mirror image or a double mirror image of the curve of the preceding quadrant. For example the curve of the third quadrant is a single mirror image of the curve of the second quadrant if the mirror is set upon the 180° axis of ordinates. Hence operation of the input reversing mechanism alone suffices at 180°. The curve of the second quadrant is a double mirror image of the curve of the first quadrant (mirrors set upon the 0 horizontal axis and upon the 90° vertical axis). Hence operation of both reversing mechanisms is required at 90°, and the same thing is true at 270°. This principle enables a single quadrant variable drive to answer the needs of all four quadrants. The principle could obviously be applied, however, to a case in which a continuous variable drive covers two quadrants, as 0° to 180°. In such case the input reversing mechanism alone would be required. Other applications are obvious.

In Figs. 19 to 22 inclusive, disclosure is made of another form of cosine cam gear which is combined with reversing mechanism of the kind already described and which, when so combined, is adapted to produce the same results as those described with reference to Figs. 1 to 18.

The cam gear 101 is provided with upstanding teeth 102 arranged upon a spiral track and disposed at uniform intervals. This gear is rotated by a gear 103 which is driven reversibly from an input operating member. The rotation of the gear 101 is proportional to the turning of the input member from the starting point or from any point corresponding to the beginning of a quadrant. The teeth 102 drive a follower gear 104 which is slidingly mounted upon a square shaft 105. The shaft 105 carries an output gear 106 which is operated in proportion to the versedsine of the input angle. This result is secured by making the total length of the cam from the point of beginning to any selected point proportional to the versedsine of the input angle. By the input angle is meant the basic reference angle. For example, if the cam gear is designed to turn through five revolutions to produce the versedsine outputs for a single quadrant, then the basic or reference angle is always one-twentieth of the actual angle through which the gear 101 has been turned from the starting point. The versedsine output is secured by making the radius of the spiral at every point proportional to the change of the versedsine of the basic angle with respect to the basic angle, or in other words, by making the radius always proportional to the sine of the basic angle.

In order to induce the follower gear 104 to maintain driving engagement with the teeth 102 of the spiral track at all times, provision is made of a guide finger 107 to lie opposite the bottom of the gear 104. The finger 107 is carried upon a travelling arm 108 which is slidingly mounted upon a shaft 109. The shaft 109 is stationarily mounted in brackets 110 and 111 carried by a base member 112. The brackets 110 and 111 also serve to rotatably support cylindrical bearing portions of the shaft 105.

The arm 108 is provided with a shouldered tooth 113 for engaging the rear face of the gear 104. At the forward side of the gear the arm extends inward across the forward face of the gear and bears against a cylindrical hub member 114 of the gear. Thus the arm and the gear are constrained to move longitudinally as a unit.

Figure 19:
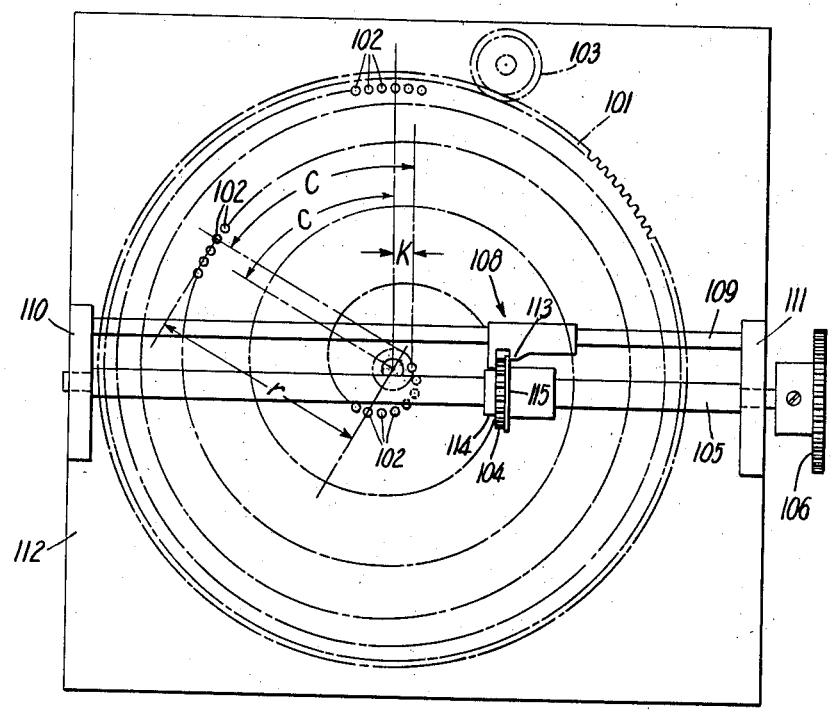
Fig. 19 is a plan view of another form of cosine cam gear with associated input and output connections.
Figure 20:
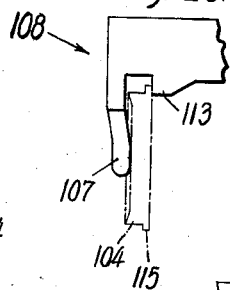
Fig. 20 is a fragmentary, plan view, partly diagrammatic, showing the relation of certain parts of the output follower.
Figure 21:
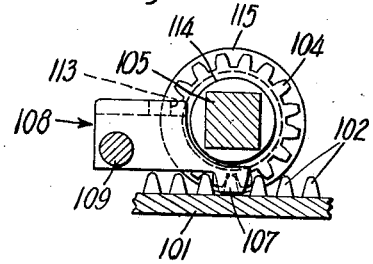
Fig. 21 is a fragmentary, vertical, sectional view showing details of the output connections.
Figure 22:
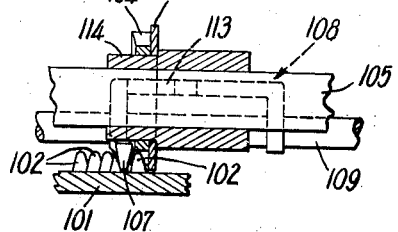
Fig. 22 is a fragmentary, sectional, vertical view showing details of the output connection.

As will be clearly seen in Fig. 19, the axis of the shaft 105 does not intersect the axis of the gear 101 but instead passes to one side of it. As a result of this arrangement when the cam gear is rotated in a counter-clockwise direction and the radius of the track is very small the teeth 102 enter the gear 104 through the face of the gear. They leave the gear 104, however, through its periphery because they do not start to travel away from the gear in the direction of its axis until they have passed substantially beyond the axis of the shaft 105.

It will be observed that the gear teeth 102 are in the form of rounded cones. The back of the gear 104 is in the form of a solid disc 115 having a forward face which slopes at substantially the same angle as the slope of the conical gear teeth 102. The finger 107 also has a tooth engaging surface of similar slope. The forward surface of the finger 107 is also similarly sloped so that the finger is tapering in form. This is important for the reason that at the very beginning of the operation the finger must stand part way across the space between the first and second teeth of the spiral. Otherwise, the mechanism could not be operated completely to a zero position.

It is to be understood, of course, that when the cam has been operated through its entire cycle from the point of beginning to the extreme outer tooth of the spiral, an amount corresponding to 90° of the basic angle, the input is automatically reversed so that the gear now travels back to the point of beginning at which point the input is again automatically reversed.

In the output end of the train an output reverser is provided after the gear 106 for reversing the output according to exactly the same law as that pointed out in connection with the form of apparatus first described.

The number of turns to be given the spiral and the maximum radius are arbitrarily selected. The spiral path may then be drawn on the assumption that the full number of turns which the spiral is to have, corresponds to a basic angle of 90°. For example, if the spiral is constructed to have exactly five complete turns, that would mean that rotating the spiral gear through twenty quadrants corresponds to one quadrant of the basic angle. The design of a five turn spiral gear is governed by the following formulas:

Let

A = basic angle in radians
I = 20A = input in radians
O = 20 (1-cos A) = output
R = effective radius of outermost tooth = 1
r = effective radius of any specified tooth
K = offset of follower gear shaft from axis of spiral gear $$\frac{r}{R} = \frac{dO}{dI} = \frac{d20(1-\cos A)}{d20A} = \frac{20d(-\cos A)}{20dA} = \sin A$$

a = one toothspace of follower gear, the uniform increment of output for each tooth of the spiral gear (other than the first and last) which passes through driving engagement with the follower.

Each tooth other than the innermost tooth is so located that the total input, the total output and the effective radius are consistent with one another under the formulas when that tooth is in engagement with the follower gear and is in a prescribed relation to the follower gear axis, say directly under the axis.

In laying out the gear an offset circle having radius K is drawn and the effective tooth radius is measured along a tangent to that circle.

When one tooth is correctly located the total input, the total output, and the effective radius of that tooth are known. To determine the correct location of the next tooth the uniform increment of output a is added to the known output and the corresponding values of the new total input and the new radius are computed from the formulas to correspond with this new total output.

A tangent along which the effective radius is to be measured is drawn to the offset circle, at an angle with the corresponding tangent of the preceding tooth equal to the computed increment of input. The new effective radius is measured from the point of tangency and its terminus is marked as the correct location for the center of the new tooth. The laying out of the gear may proceed from the innermost tooth outward, or from the outermost tooth inward.

A slight amount of lost motion is provided between the teeth of the spiral and follower gears to allow for slight irregularities of spacing of the spiral gear teeth.

While the cam has been referred to as a cosine cam it is apparent that, since the cosine has a value of 1 when the angle has a value of zero and the cosine has a value of zero when the angle has a value of 90° the output of the cam will be related to the basic angle A as the versedine is related to the basic angle. If on the other hand the operation of the gear is started from the outermost tooth and run toward the center through any angle 20B, the extent of the corresponding output will be constantly equal to twenty times the sine of the basic angle B.

No claim is made per se to the improvements in variable ratio gearing disclosed in, and in connection with, Figures 19 to 22, inclusive. That subject matter constitutes a portion of the invention disclosed and claimed in our pending application, Serial No. 371,740, filed December 26, 1940, for Variable ratio gearing, which application is a continuation in part hereof.

We have described what we believe to be the best embodiments of our invention. We do not wish, however, to be confined to the embodiments shown, but what we desire to cover by Letters Patent is set forth in the appended claims.

We claim:

1. A variable ratio driving mechanism comprising, in combination, a rotary input member, a rotary output member, variable ratio transmission gearing operatively interposed between said members for operation by the input member throughout a plurality of revolutions in uniformly magnified relation to a basic angle which varies between zero and 90°, and constructed and arranged to cause the total operation of the output member throughout a plurality of revolutions thereof corresponding to the range from zero to 90° of the basic angle to be constantly proportional to a trigonometric function of the basic angle having finite limits, input reversing mechanism between the input member and the variable ratio transmission gearing to reverse the direction of drive of said variable ratio gearing relative to the input member, and means operated by and in proportion to the input member for operating the reversing mechanism at the end of the first quadrant of the basic angle.

2. A variable ratio driving mechanism comprising, in combination, a rotary input member, a rotary output member, variable ratio transmission gearing operatively interposed between said members for operation by the input member throughout a plurality of revolutions in uniformly magnified relation to a basic angle which varies between zero and 90°, and constructed and arranged to cause the total operation of the output member throughout a plurality of revolutions thereof corresponding to the range from zero to 90° of the basic angle to be constantly proportional to a trigonometric function of the basic angle having finite limits, input reversing mechanism between the input member and the variable ratio gearing to reverse the direction of drive of said variable ratio gearing relative to the input member at the end of each quadrant of the basic angle, driving means for said reversing mechanism connected for operation by and in a uniform relation to said input member, and output reversing mechanism for reversing the drive of the output member relative to the variable ratio gearing at the ends of alternate quadrants of the basic angle, said driving means being connected to drive the output reversing mechanism as well as the input reversing mechanism.

3. A variable ratio driving mechanism comprising, in combination, a rotary input member, a rotary output member, variable ratio transmission gearing operatively interposed between said members for operation by the input member throughout a plurality of revolutions in uniformly magnified relation to a basic angle which varies between zero and 90°, and constructed and arranged to cause the total operation of the output member throughout a plurality of revolutions thereof corresponding to the range from zero to 90° of the basic angle to be constantly proportional to a trigonometric function of the basic angle having finite limits, input reversing mechanism between the input member and the variable ratio gearing to reverse the direction of drive of said variable ratio gearing relative to the input member at the end of the first quadrant of the basic angle, the input reversing mechanism comprising alternative driving trains of opposite effect between the input member and the variable ratio gearing, a clutch for alternatively making trains effective, a clutch shifter, a controller therefor, and means driven by the input member in constant relation thereto for operating said controller.

4. A variable ratio driving mechanism comprising, in combination, a rotary input member, a rotary output member, variable ratio transmission gearing operatively interposed between said members for operation by the input member throughout a plurality of revolutions in uniformly magnified relation to a basic angle which varies between zero and 90°, and constructed and arranged to cause the total operation of the output member throughout a plurality of revolutions thereof corresponding to the range from zero to 90° of the basic angle to be constantly proportional to a trigonometric function of the basic angle having finite limits, input reversing mechanism between the input member and the variable ratio gearing to reverse the direction of drive of said variable ratio gearing relative to the input member at the end of the first quadrant of the basic angle, the input reversing mechanism comprising alternative driving trains of opposite effect between the input member and the variable ratio gearing, a clutch for alternatively making the trains effective, a clutch shifter, a controller therefor, means driven by the input member in constant relation thereto for operating said controller, and output reversing means comprising alternative trains of opposite effect between the variable ratio gearing and the output member, a clutch for alternatively making the trains effective, a clutch shifter and a controller therefor, said controller having elements in common with the controller for the clutch shifter of the input reversing mechanism, and being driven in common therewith from the input member.

5. A variable ratio driving mechanism comprising, in combination, a rotary input member, a rotary output member, variable ratio transmission gearing operatively interposed between said members for operation by the input member throughout a plurality of revolutions in uniformly magnified relation to a basic angle which varies between zero and 90°, and constructed and arranged to cause the total operation of the output member throughout a plurality of revolutions thereof corresponding to the range from zero to 90° of the basic angle to be constantly proportional to a trigonometric function of the basic angle having finite limits, input reversing mechanism between the input member and the variable ratio gearing to reverse the direction of drive of the variable ratio gearing relative to the input member at the end of the first quadrant of the basic angle, the input reversing mechanism comprising alternative driving trains of opposite effect between the input member and the variable ratio gearing, a clutch for alternatively making trains effective, a clutch shifter, and an input revolution measuring means controlling the clutch shifting means and consisting of Geneva gearing.

6. A variable ratio driving mechanism as claimed in claim 1 in which the variable ratio gearing includes a pair of flat members constituting primary gears and each having a function determining track, both primary gears being driven by the rotary input member, and a secondary gear for driving the output member, and means including the function determining tracks of the primary gears for providing complementary driving means from the primary gears to the secondary gear for transmitting the two drives to the secondary gear upon angularly related radii of the secondary gear.

7. A variable ratio driving mechanism as claimed in claim 1, in which the variable ratio gearing includes a pair of flat members constituting primary gears and each having a function determining track, both primary gears being driven by the rotary input member, and a secondary gear for driving the output member, and means including the function determining tracks of the primary gears for providing complementary driving means from the primary gears to the secondary gear for transmitting the two drives to the secondary gear upon angularly related radii of the secondary gear, the secondary gear being supported between the primary gears, the function determining tracks of the primary gears being in the form of cam grooves, and each of said complementary driving means comprising one of said tracks and a cooperative follower, each follower being mounted in fixed angular relation to the secondary gear.

8. A variable ratio driving mechanism as claimed in claim 1, in which the variable ratio gearing includes a pair of flat members constituting primary gears and each having a function determining track, both primary gears being driven by the rotary input member, and a secondary gear for driving the output member, and means including the function determining tracks of the primary gears for providing complementary driving means from the primary gears to the secondary gear for transmitting the two drives to the secondary gear upon angularly related radii of the secondary gear, the secondary gear being supported between the primary gears, and the function determining tracks of the primary gears being in the form of cam grooves, each having a multiplicity of convolutions and each of said complementary driving means comprising one of said tracks and a cooperative follower, the follower being mounted in fixed angular relation to the secondary gear.

WILLIAM MAXSON.
PETER J. McLAREN.